US010429261B2

(12) United States Patent
Skallebæk et al.

(10) Patent No.: US 10,429,261 B2
(45) Date of Patent: Oct. 1, 2019

(54) PRESSURE SENSOR DEVICE FOR UTILITY NETWORK

(71) Applicant: Kamstrup A/S, Skanderborg (DK)

(72) Inventors: Anders Skallebæk, Skanderborg (DK); Jens Lykke Sørensen, Beder (DK); Kristian Rokkjær, Hinnerup (DE)

(73) Assignee: KAMSTRUP A/S, Skanderborg (DK)

( * ) Notice: Subject to any disclaimer, the term of this patent is extended or adjusted under 35 U.S.C. 154(b) by 233 days.

(21) Appl. No.: 15/323,626

(22) PCT Filed: Jul. 3, 2015

(86) PCT No.: PCT/DK2015/050203
§ 371 (c)(1),
(2) Date: Jan. 3, 2017

(87) PCT Pub. No.: WO2016/000724
PCT Pub. Date: Jan. 7, 2016

(65) Prior Publication Data
US 2017/0122829 A1    May 4, 2017

(30) Foreign Application Priority Data

Jul. 3, 2014    (EP) .................................... 14175627

(51) Int. Cl.
*G01L 19/08* (2006.01)
*E03B 7/00* (2006.01)
*G01M 3/28* (2006.01)

(52) U.S. Cl.
CPC ............ *G01L 19/086* (2013.01); *E03B 7/003* (2013.01); *G01M 3/2815* (2013.01)

(58) Field of Classification Search
CPC .................................................. G01L 19/086
See application file for complete search history.

(56) References Cited

U.S. PATENT DOCUMENTS

2005/0039520 A1*    2/2005 Davis .................... G01F 1/7082
73/49.5

FOREIGN PATENT DOCUMENTS

GB        2 356 255 A    5/2001
WO        1995/06763     5/1995
(Continued)

OTHER PUBLICATIONS

International Search Report for corresponding patent application No. PCT/DK2015/050203 dated Oct. 12, 2015.

*Primary Examiner* — Manuel A Rivera Vargas
(74) *Attorney, Agent, or Firm* — Renner Otto Boisselle and Sklar LLP

(57) ABSTRACT

The invention provides a pressure sensor device arranged for measuring a pressure in a fluid pipe system, e.g. a utility network. A measurement system with a pressure sensor serves to measure pressure in the fluid pipe system, and a data processing unit determines at least one statistical parameter in response to a plurality of pressure measurements. Data packets with the statistical parameter is then transmitted by means of a communication module, e.g. via a data network which serves for remote reading of utility meters. The statistical parameter is selected from the second, third and fourth statistical moments of the pressures measured with the plurality of measurements of pressure. The pressure sensor device in a battery driven form can be placed at remote locations in a fluid pipe system to monitor pressure transients, e.g. in a water distribution system. Especially, a time stamp may follow the statistical parameter(s) sent, such that it is possible to track pressure transient creating events on the fluid pipe system.

15 Claims, 5 Drawing Sheets

(56) References Cited

FOREIGN PATENT DOCUMENTS

WO     2012/175267     12/2012
WO     2014/0833440     6/2014

\* cited by examiner

| Time stamp 1 | $s_1$ | $s_2$ | $s_3$ | $s_4$ | ... |
| --- | --- | --- | --- | --- | --- |
| Time stamp 2 | $s_1$ | $s_2$ | $s_3$ | $s_4$ | ... |
| Time stamp 3 | $s_1$ | $s_2$ | $s_3$ | $s_4$ | ... |
| ... | ... | ... | ... | ... | ... |

Fig. 4

PRESSURE SENSOR DEVICE FOR UTILITY NETWORK

This application is a national phase of International Application No. PCT/DK2015/050203 filed Jul. 3, 2015 and claims priority to European Application No. 14175627.0 filed Jul. 3, 2014 and published in the English language.

FIELD OF THE INVENTION

The present invention relates to the field of pressure sensor devices. Especially, the invention provides a pressure sensor device arranged for mounting in a fluid pipe system, e.g. a pipe system forming part of a utility network.

BACKGROUND OF THE INVENTION

Pressure sensor devices capable of sensing a pressure in a utility network, such as a water distribution network, are known.

Chinese Patent Application published as CN101308364 A discloses a method of transient analysis in a water distribution network, the method relating to pressure measurements, flow data and data on the network per se to estimate the state of the network.

Also networks of consumption meters with pressure sensors are known.

Japanese Patent Application published as JP3076645 U discloses a system to monitor a water supply line in terms of parameters such as water supply flow, pressure, temperature, chlorine concentration, pH etc., and, upon receipt of data related to these parameters in a reception processing control unit, if necessary, to issue an alarm relating to leaks, bursts, excessive concentrations etc.

These prior art devices, systems or methods are adapted to continuously monitor utility networks. Accordingly, they have high power consumption and require external power supply, or, if battery powered, have a short life time.

SUMMARY OF THE INVENTION

Thus, according to the above description, there is a need for pressure meters, which are capable of providing relevant information on the pressure conditions of the network, while keeping the power consumption at a minimum. In particular, there is a need for pressure meters, which are capable of providing relevant information relating to pressure transients, which are known to be a main contributor to water supply line wear, leaks and bursts.

In a first aspect, the invention provides a pressure sensor device arranged for measuring a pressure in a fluid pipe system, such as a utility network, the device comprising
  a measurement system comprising a pressure sensor arranged for performing measurements of pressure at a position in the fluid pipe system,
  a data processing unit arranged for processing data related to the measurements of pressure so as to determine at least one first statistical parameter in response to a plurality of measurements of pressure, and
  a communication module arranged for transmitting data packets representing the at least one first statistical parameter to an associated receiver,
characterized in that
the at least one first statistical parameter is selected from the second statistical moment, the third statistical moment, and the fourth statistical moment, calculated in response to the plurality of measurements of pressure.

By a 'statistical parameter' is understood a parameter represented by a value calculated according to a predefined algorithm in response to a plurality of measured values, each representing single pressure measurements, so as to provide a descriptive and condensed representation of the plurality of single pressure measurements. Simple examples are: peak value, average, and standard deviation. More complex algorithms involve e.g. a Fourier transform to provide e.g. distribution of frequencies of pressure data. In the following, further details regarding preferred statistical parameters to describe the occurrence of pressure transients will be presented.

The second, third, and fourth statistical moments have proven proper measures of the pattern of pressures observed with fluid pipe systems. Especially, the second, third and fourth statistical moments have proven to provide valuable information regarding the presence of pressure transients, and pressure transients are relevant information to observe in a utility network, e.g. for monitoring various conditions of the utility network. Still, based on a limited number of single pressure sample values, e.g. the third statistical moment provides information which allows reduction of electric power required for the measurement, and also for the (radio frequency) transmission of data. Thus, it allows the device to be battery powered, even if the device forms part of a consumption meters with an expected long battery life-time due to the limited power required for measurements and for transmitting the condensed data in the form of the third statistical moment.

The second statistical moment is defined as:

$$\mu_q = <x^q>; q=2$$

The third statistical moment is defined as:

$$\mu_q = <x^q>; q=3$$

The second statistical moment is defined as:

$$\mu_q = <x^q>; q=4$$

With all of these statistical moments, the pressure excursion $x_j$ from the average is defined as $x_j = p_j - <p>$, and the brackets $< \ldots >$ denote average over the ensemble of plurality of samples.

In particular the third statistical moment, skewness, of the pressures measured with the plurality of measurements of pressure has proven a proper measure of the occurence of pressure measurements with anormal pressure values. Especially with positive values of the third moment, indicating pressure transients, the information related to the third moment is valuable to the operator of the fluid pipe system.

Likewise, the fourth moment, the kurtosis or the flatness of the pressure distribution, is a measure of the relative abundance of pressure transients at high pressure.

The pressure sensor device is advantageous for use e.g. in a utility network, e.g. a water supply system, where it is desirable to monitor occurance of pressure transients at various locations in the supply pipe system, since such high pressure peaks can cause damage to the pipe system and components connected thereto, thus leading to leakages. The defined device is capable of providing transmission of pressure measured at remote locations in a pipe system. Due to the statistical parameter determined in the device, the number of data to be remotely transmitted, e.g. wirelessly, can be reduced. Thus, data traffic on the remote reading network is reduced. Further, compared to a device measuring and transmitting measured pressure values directly, electric power consumption can be reduced to the communication module, thus allowing battery powering of the communication module, even the entire device, and such battery can still provide power enough for a long period of operation without the need for service. Additionally, or alternatively, this allows for performing of many single pressure measurements with a short sample interval, and still the amount of data to be transmitted can be limited to one or a few statistical parameter values together with a time stamp. This can provide valuable information that allows e.g. tracking of equipment in the supply pipe system that causes high pressure transients or peaks.

In the following a number of embodiments and additional features will be described.

Preferably, the device is arranged for installation on a fluid pipe forming part of a utility network, thus allowing the pressure sensor to measure the pressure of the fluid distributed by the utility network.

The measurement system may be arranged for performing measurements of pressure according to a predefined measurement time sequence. Especially, the predefined measurement time sequence of a duration of 5 seconds to 2 minutes, such as a duration of 10 seconds to 60 seconds. The predefined measurement time sequence may be selected so that pressure is measured at a measurement time at least once within a measurement time window, wherein the measurement time windows are periodically spaced in time, e.g. evenly spaced in time or randomly spaced in time. By a random temporal distribution of measurement time windows, a possible temporal locking to events on the fluid pipe system which occure at fixed time intervals can be avoided, thus ensuring such events to be measured. Especially, the measurement system may be arranged for measuring pressure at a plurality of measurement times within the measurement time window, e.g. to perform a plurality of consecutive meaurements within the measurement time window, e.g. such as at least two, three, or more measurement times within the measurement time window, e.g. 10-1000, such as 20-200, such as 10-100, measurement times within the measurement time window.

The communication module may be arranged to transmit the data packets according to a predefined transmission time sequence. E.g. the predefined transmission time sequence may be selected so that a data packet is transmitted at a transmit time within a transmit time window, wherein the transmit time windows are periodically spaced in time, such as evenly spaced in time. Especially, the transmit time windows may have an average transmit frequency over time, and wherein the measurement time windows have an average measurement frequency over time as well, the average transmit frequency over time being lower than the average measurement frequency over time.

The device may be arranged to include in the data packets a time stamp for indicating a time for performing the plurality of measurements of pressure associated with the respective at least one statistical parameter. This allows matching of the statistical pressure parameters with information about time of operation of associated equipment, e.g. operation of valves and pumps etc. which can cause pressure transients.

The at least one first statistical parameter may relate to pressure transients. Especially, the at least one first statistical parameter may relate to temporal distribution of pressure transients, and/or pressure distribution of pressure transients.

The data processing unit may further be arranged to calculate one or more second statistical parameters in response to the plurality of pressure measurements, and to transmit data packets representing the one or more second statistical parameters.

Especially, the data processing unit may be arranged to calculate as a second statistical parameter coefficients of a Fast Fourier Transform (FFT) on values related to a time series of pressure measurements, such as a sequence of 16-128 pressure measurements within a measurement time window.

Also the second statistical parameter may be selected from the average pressure measured with the plurality of measurements of pressure, the maximum pressure measured with the plurality of measurements of pressure, and the minimum pressure measured with the plurality of measurements of pressure.

The device may be arranged for measuring an additional parameter in addition to pressure. Especially, such additional parameter may be selected from the group of: parameters of flow rate, temperature, noise, and turbidity.

The device may be integrated with a consumption meter arranged for measuring a flow rate of the fluid, and for transmitting data packets comprising consumption data to an associated receiver. By integration is meant at least partly sharing processing circuits etc., and especially the consumption meter facility and the pressure measuring facility may use one common processor, and especially all component of the consumption meter and the pressure sensor device may be housed within one common housing.

In a special embodiment, the communication module is arranged to transmit the data packets according to a predefined transmission time sequence within transmit time windows having an average transmit frequency over time, and wherein the device is arranged for transmitting data packets comprising consumption data to an associated receiver according to a predefined consumption data transmission time sequence, wherein the predefined consumption data transmission time sequence is selected so that a data packet comprising consumption data is transmitted at a consumption data transmit time within a consumption data transmit time window, the consumption data transmit time windows being periodically spaced in time, wherein the consumption data transmit time windows have an average consumption data transmit frequency over time, and wherein average transmit frequency over time is smaller than the average consumption data transmit frequency over time.

The communication module may be arranged to receive data from an associated remote transmitter. The data from the remote transmitter may comprise control data, and wherein the device is arranged to change at least a parameter related to the pressure measurement time sequence and/or a parameter related to the data packet transmission time sequence. E.g., the device can be arranged for reprogramming with respect to various parameters related to sequences of measurement and transmission of data packets. Especially, the measurement system may be arranged to perform a pressure measurement in response to a request from the associated remote transmitter. E.g. such remote transmitter can be a portable device, e.g. a mobile phone or a dedicated device, carried by a service person who can operate the portable device to request pressure measurements from a specific pressure sensor device. Especially, the device may be arranged to store a plurality of statistical parameters corresponding to pressure measurements performed at respective measurement times, and to transmit said statistical parameters in data packets in response to a request received from the associated remote transmitter.

As mentioned, the device is capable of saving power compared to prior art pressure sensor devices, and thus in a preferred embodiment, the device is battery powered.

The pressure sensor can be a transducer operating to various principles and should be selected according to the fluid to measure etc. More details regarding different sensors will be given later. Especially, it may be preferred that the pressure sensor is arranged to measure a fluid pressure of at least 10 kPa. Preferably, the pressure sensor is arranged to measure a fluid pressure of at least 200 kPa, such as at least 500 kPa, or such as at least 1,000 kPa, or such as at least 2,000 kPa, or such as at least 4,000 kPa, or such as at least 8,000 kPa, or such as at least 10,000 kPa.

The communication module may be arranged to transmit the data packets representing the at least one first statistical parameter via a communication network arranged for remote reading of utility meters. Thus, such embodiment of the device is capable of utilizing an already existing data network for transmission of the data packets.

The communication module may be arranged to transmit the data packets representing the at least one first statistical parameter in response to a measured pressure value or a parameter derived therefrom exceeding a predefined threshold. Hereby, the amount of data to be transmitted can be further reduced, since only values exceeding a predefined threshold are selected to be sent.

At least part of the measurement system, the data processing unit, and at least part of the communication module are housed within one single housing. Thus, a compact device can be provided. Especially, said single housing can be formed by a monolithic polymer structure. Especially, said single housing may have a through-going opening arranged for fluid passage, and a cavity separated from the through-going opening, wherein the cavity is arranged for housing the at least part of the measurement system, the data processing unit, and the at least part of the communication module. Especially, said single housing may be shaped such that a space defined by the cavity and a plane covering an opening of the cavity houses the at least part of the measurement system, the data processing unit, and the at least part of the communication module. The device in such embodiment may comprise a cover arranged to fit to an opening to the cavity such that the cavity forms a watertight enclosure together with the cover. Especially, all of the measurement system, the data processing unit, and the communication module may be housed within said single housing, e.g. together with a battery for powering all of the electrically demanding components of the device. Thus, a very compact device can be provided.

Alternative to a position of the pressure sensor within a housing with a through-going opening for connection to the fluid to measure, the pressure sensor may be mounted directly on a pipe of the fluid pipe system.

Alternatively, the communication module may be arranged within a housing which forms a unit which is separate from the measurement system and the data processing unit. Especially, this may be combined with the measurement system and the data processing unit being arranged within one single housing.

Especially, the device is arranged for measuring pressure in a fluid pipe system, wherein the fluid is one of: gas, water, a fluid for heating, a fluid for cooling.

In a second aspect, the invention provides a pressure sensor system arranged for measurement of pressure in a fluid pipe system, such as a utilty network, the system comprising a plurality of pressure sensor devices according to the first aspect, arranged for measuring pressure at respective positions in the fluid pipe system, and a receiver arranged to receive data packets representing the at least one first statistical parameter from the plurality of pressure sensor devices.

Especially, the receiver may be arranged to receive the data packets representing the at least one first statistical parameter via a communication network arranged for remote reading of utility meters, such as a wireless communication network.

In a third aspect, the invention provides a method for monitoring pressure in a fluid pipe system, such as a utility network, the method comprising performing pressure measurements with a pressure sensor arranged at a position in the fluid pipe system, determining at least one first statistical parameter in response to a plurality of pressure measurements, and transmitting data packets representing the at least first one statistical parameter to an associated receiver, characterized in that the at least one first statistical parameter is selected from: the second, third and fourth statistical moments calculated in response to the plurality of measurements of pressure.

In a fourth aspect, the invention provides a computer executable program code arranged to perform the method according to the third aspect, such as a computer executable program code stored on a data carrier. The program code may be implemented on any type of processing platform, especially a processor arranged for operation in a battery powered environment.

In a fifth aspect, the invention provides a pressure sensor device arranged for measuring a pressure in a fluid pipe system, such as a utility network, the device comprising a measurement system comprising a pressure sensor arranged for performing measurements of pressure at a position in the fluid pipe system, and a data processing unit arranged for processing data related to the measurements of pressure so as to determine at least one first statistical parameter in response to a plurality of measurements of pressure, wherein the at least one first statistical parameter is selected from: the second, third and fourth statistical moments calculated in response to the plurality of measurements of pressure.

Especially, the data processing unit is arranged to provide an output representing said at least one statistical parameter. E.g. such output is preferably in a suitable form for being received by an associated communication module arranged to transmit data packets containing data representing the at least one first statistical parameter, e.g. in a wireless form.

It is appreciated that the same advantages and embodiments described for the first aspect apply as well for the second, third, fourth, and fifth aspects. Further, it is appreciated that the described embodiments can be intermixed in any way between all the mentioned aspects.

BRIEF DESCRIPTION OF THE FIGURES

The invention will now be described in more detail with regard to the accompanying figures of which

FIG. 4 illustrates organisation of data packets with a plurality of statistical parameters each associated with a time stamp.

The figures illustrate specific ways of implementing the present invention and are not to be construed as being limiting to other possible embodiments falling within the scope of the attached claim set.

DETAILED DESCRIPTION OF EMBODIMENTS

Figure 1:
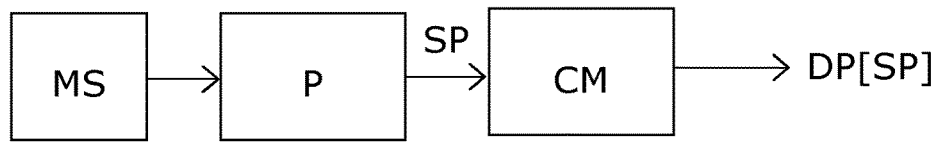
FIG. 1 illustrates a block diagram of basic components of a device embodiment.

FIG. 1 illustrates a pressure sensor device embodiment arranged for measuring a pressure in a fluid pipe system, e.g. a utility network. A measurement system MS comprises a pressure sensor and is arranged for performing measurements of pressure at a position in the fluid pipe system, e.g. according to a predefined measurement time sequence. The measurement system MS provides data representing measured pressure values to a data processing unit P.

The data processing unit P is arranged for processing the measured pressure values or pressure samples, e.g. a predefined number of single pressure values measured within 10-60 seconds, according to a predefined algorithm so as to determine a first statistical parameter SP in response to a plurality of measurements of pressure. E.g. the data processing system is arranged to process the measured pressure values according to a plurality of separate algorithms so as to arrive at the first, and optionally more, statistical parameters SP accordingly.

A communication module CM, e.g. a wireless Radio Frequency transmission module, is arranged for transmitting data packets DP[SP] representing the determined statistical parameter(s) to an associated receiver. E.g. such data packets DP[SP] further contain a time stamp indicating when the corresponding pressure measurements are performed, and e.g. an identification number serving to identify the pressure sensor device which has transmitted the data packets DP[SP]. The communication module CM can transmit data packets DP[SP] according to a predefined transmit time sequence, or the device may be capable of storing a number of statistical parameters deteremined over a period of time, and then transmit data packets DP[SP] accordingly in response to a request received from a remote transmitter.

Such device can provide valuable information about potentially harmful pressure transients locally in a piping system where liquid or gas is distributed in a pipe network, e.g. a utility network. Especially, the device may be arranged for remote wireless transmission of the statistical parameters together with a time stamp, that allows a remote receiver to perform further investigation regarding occurrence of pressure transients at a specific location where the pressure sensor device has measured the pressure of the fluid. Due to the on-board data processing that determines at least a first statistical parameter of the measured pressure, the device only needs to transmit a rather sparse amount of data, thus allowing electrical power for the data transmission to be reduced, therefore allowing battery powering, and thus enabling the device to be mounted at remote locations without electrical power installations.

Figure 2:
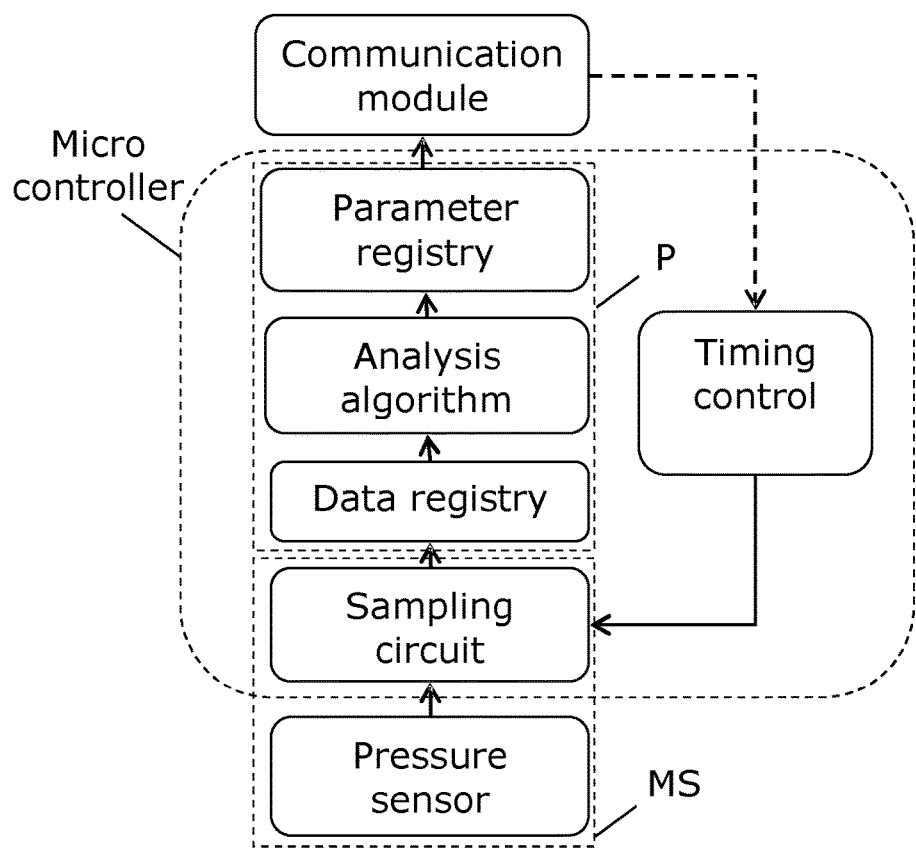
FIG. 2 illustrates a more detailed block diagram of components of a device embodiment.

FIG. 2 shows a block diagram of more details regarding a possible implementation of the pressure measurement system MS, and the data processing unit P. A pressure sensor mounted to sense the fluid pressure provides an analog electrical signal in response to the sensed pressure, and this analog electrical signal is provided to a sampling circuit which samples the signal and converts samples into pressure values. The sampled pressures are stored in a raw data registry.

An analyzing algorithm performs suitable statistical analysis on the raw data to extract the desired information described by a number of statistical parameters. The statistical parameters are stored in the parameter registry together with a time stamp indicating the time for the measurement. A communication module transmits the contents of the parameter registry, either with regular time intervals or when requested to do so via a communication network. Alternatively, the transmitter can be requested to perform a single set of pressure measurements or a number of sets of measurements via the communication network. A timing control serves to control timing of both data sampling and may, as indicated, be controlled in response to information from the communication module. The data processing unit P and part of the measurement system MS can be implemented by a micro controller, as shown.

According to the invention, the at least one first statistical moments of the pressure distributions are selected from:

$$\mu_q = <x^q> \quad 2 \leq q \leq 4$$

Here, the pressure excursion from the average is defined as $x_j = p_j - <p>$. The brackets $< \ldots >$ denote average over the ensemble of samples. Hence, the average pressure is merely $<p>$, and the first moment of x, $\mu_1$, is trivially zero. The more moments, that are calculated, the better description of the distribution function of pressure excursions can be obtained.

In the following, a description of embodiments of various second statistical parameters that can be determined by the data processing unit will be described. Especially, the pattern of pressure transients, measured in a time sequence of pressure samples, can be described by appropriate statistical parameters, such as:

1) The coefficients of a Fourier transform of the time series of measured pressure values. The resolution of the Fourier transform is chosen as a compromise between the amount of data to be transmitted and the amount of information about the transients desired to transmit. Computationally it is advantageous to use the fast Fourier transform technique (FFT).

2) Maximum likelihood estimation, where an estimator is maximized with respect to one or more parameters of a probability distribution model. A likelihood function is defined as:

$$W = <\ln [f(y_k|x_j)]>$$

Here, $y_k$ are a set of model parameters, characterizing the distribution function, and $x_j$ are the measured values, defined above. The joint probability distribution function $f(y_k|x_j)$ is defined as:

$$f(y_k|x_j) = P(y_k|x_j) g(y_k)$$

Above $P(y_k|x_j)$ denote the probability that the sample $x_j$ is measured, given the parameters $y_k$, and $g(y_k)$ is the probability density at the values $y_k$. Now the task is to maximize W, given the dataset $x_j$ with respect to the parameters $y_k$. As an example, consider a normal distribution, characterized by the mean, a, and the standard deviation, σ. If a set of pressure excursions, $x_j$, are measured, a and a are chosen in a way that maximizes W.

3) Average and standard deviation. Some physical processes in nature gives rise to a probability distribution which is a normal distribution, which is completely characterized by its average and standard deviation, as mentioned above.

4) Histogram values. As a simplified form, a histogram can be used, representing the probability distribution function, by calculating the rate with which the measured values, $x_j$, are falling within the set of intervals $b_k$.

The pressure of a fluid can be measured using a variety of pressure measurement techniques using various sensor or transducer principles. These include:

1) Piezoresistive semiconductors. The conductivity and hence resistivity of semiconductors such as silicon change when the component is subject to stresses. This can be utilized to making a pressure sensor, either by placing the semiconductor on a substrate and exposing it to the fluid pressure, or by making a semiconductor membrane, which can deform when one surface is exposed to the fluid pressure.

2) Piezoresistive metallic films. By applying a metallic film in an appropriate pattern onto a substrate, such as a ceramic, the strain following a stress will deform the pattern and hence change the resistivity of the film. This change can be measured by an electrical circuit to produce a measure of an external pressure.

3) Capacitive sensors. A membrane is deformed as a result of a pressure difference between its surfaces. The deformation gives rise to a change in the electrical capacitance of a parallel plate capacitor made up by the membrane and an additional stable conducting plate. The capacitance change can be measured by a circuit and converted into a pressure difference reading.

4) Mechanical spring compression. Pressure on a surface of well defined size serves to compress a spring with known spring constant. The resulting compression can be converted mechanically or electrically into a pressure measurement.

5) Inductive sensors. The mechanical work done by the pressure serves to change the inductance of a coil, which in turn can be measured and converted into a pressure reading.

6) Piezoelectric. A piezoelectric component is employed, for which a change in stress gives rise to a potential difference across its terminals. The voltage can be sampled and integrated to produce a pressure reading.

7) Optical sensors. Fiber optical strain gauges based on Bragg gratings inherent in the fiber can be employed. A stress giving rise to a strain stretches or compresses the Bragg grating with changed optical reflection as a result. The reflected light can be recorded to produce a pressure measurement.

8) Resonant sensors. One or more membranes set in oscillation around their resonance frequencies are having one side exposed to the fluid. A change in fluid pressure will result in a change in fluid density and hence a change in membrane resonance frequency. This change can be recorded and converted into a measure of the fluid pressure.

Figure 3A:
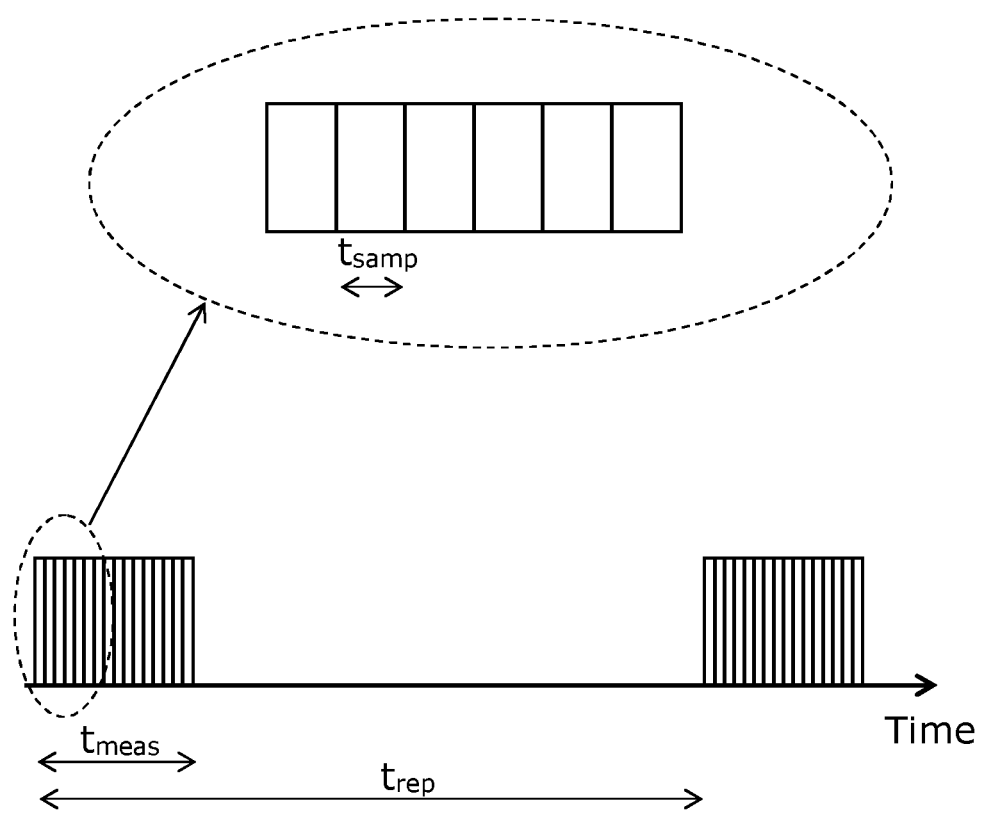
FIG. 3a illustrates an example of timing of pressure measurements.

FIG. 3a illustrates an example of a pressure sampling sequence. The pressure is sampled a number of times, such as 128 times, with a time interval $t_{samp}$ for each pressure sample which may be such as 10-200 ms, such as 100 ms, e.g. selected depending on the chosen pressure sensor technology. Thus, a measurement time sequence has a duration of $t_{meas}$ and it has a duration of n times $t_{samp}$, where n is the number of samples in the measurement sequence, e.g. 10-1000, such as 50-500, however n=128 has been found as a suitable number. Within repeated time slots $t_{rep}$, such as 96 s, measurement time sequences are preferably randomly distributed. It is to be understood that the number of samples n in a measurement time sequence can be selected according to the needs, as well as the time $t_{rep}$ between the measurement time sequences.

The at least one first statistical parameter is thus determined from all of the plurality of measurement values of the measurement time sequence $t_{meas}$, and subsequently communicated, i.e. a first statistical parameter is determined and communicated for each repetition time interval $t_{rep}$. Also or alternatively, calculated results from several measurement time sequences may be combined before being communicated.

Figure 3B:
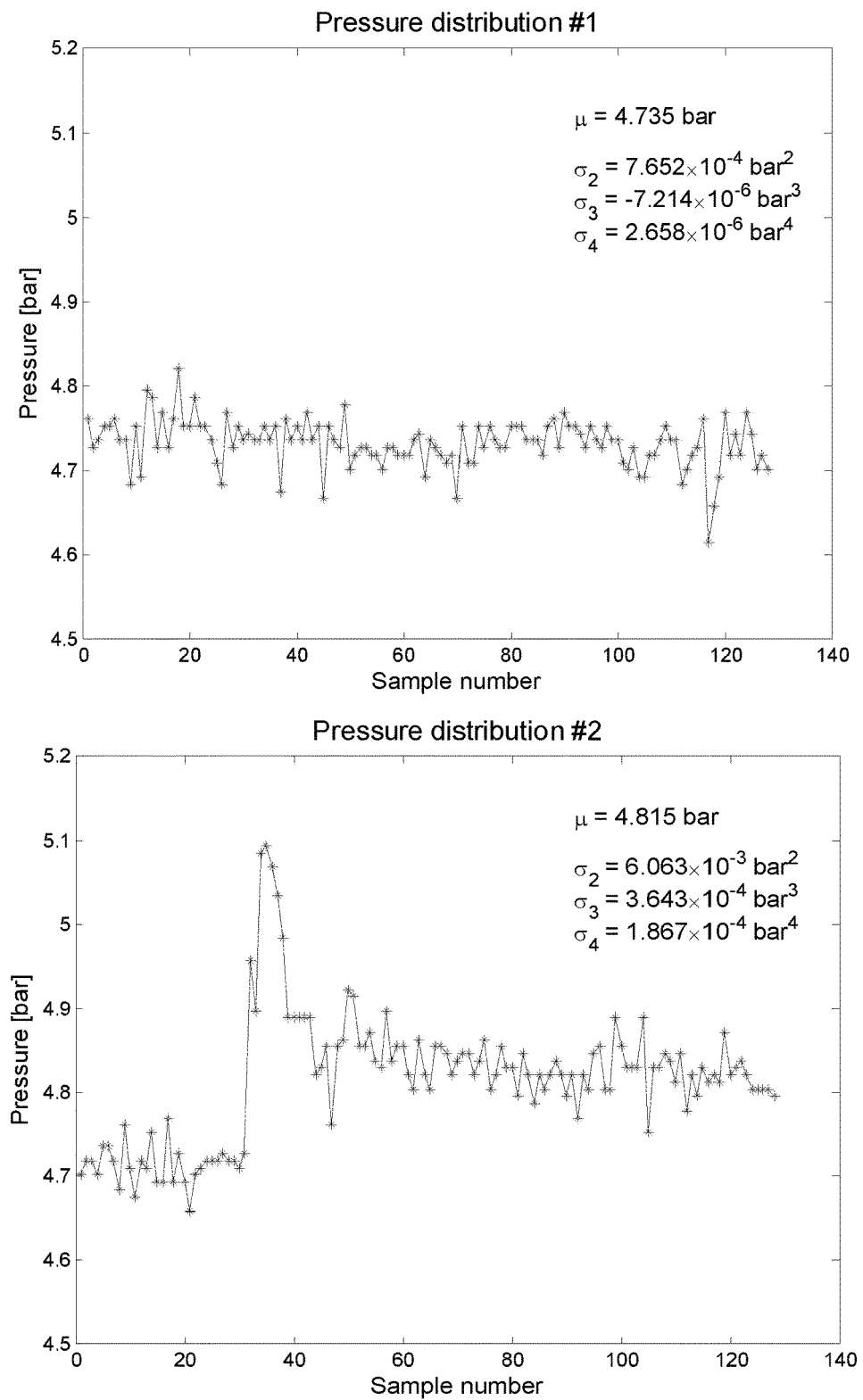
FIG. 3b illustrates two measurement time sequence examples, one without a pressure transient, and one with a pressure transient.

FIG. 3b illustrates two examples of measured time sequences each of 128 pressure measurement samples. With the set of 128 measurement samples, sampled with a sample interval of 0.1 second, the second σ2, third σ3, and fourth σ4 statistical moments are calculated based on the average pressure μ.

Upper part of FIG. 3b illustrates a measurement time sequence without a significant pressure transient. It is seen that in particular the third σ3 and fourth σ4 moments are small, in the range of $10^{-6}$ bar$^3$ and $10^{-6}$ bar$^4$. The third moment σ3 is negative due to the few and small pressure transients being below the average pressure.

Lower part of FIG. 3b illustrates a measurement time sequence with a significant pressure transient. It is seen by comparison with the results in upper part of FIG. 3b, that the third σ3 and fourth σ4 moments are larger, in the range of $10^{-4}$ bar$^3$ and $10^{-4}$ bar$^4$. This is due to the presence of the pressure transient. In particular, the third moment σ3 is positive due to the pressure transient being above average pressure.

FIG. 4 shows an example of data registry transmitted from the pressure sensor device. The communication module can transmit a data packet containing a single time stamp with an associated number of statistical parameters, $s_1$-$s_4$, or the transmitter can less frequently transmit a data packet containing a register containing a number of time stamps each with associated statistical parameters $s_1$-$s_4$.

Figure 5:
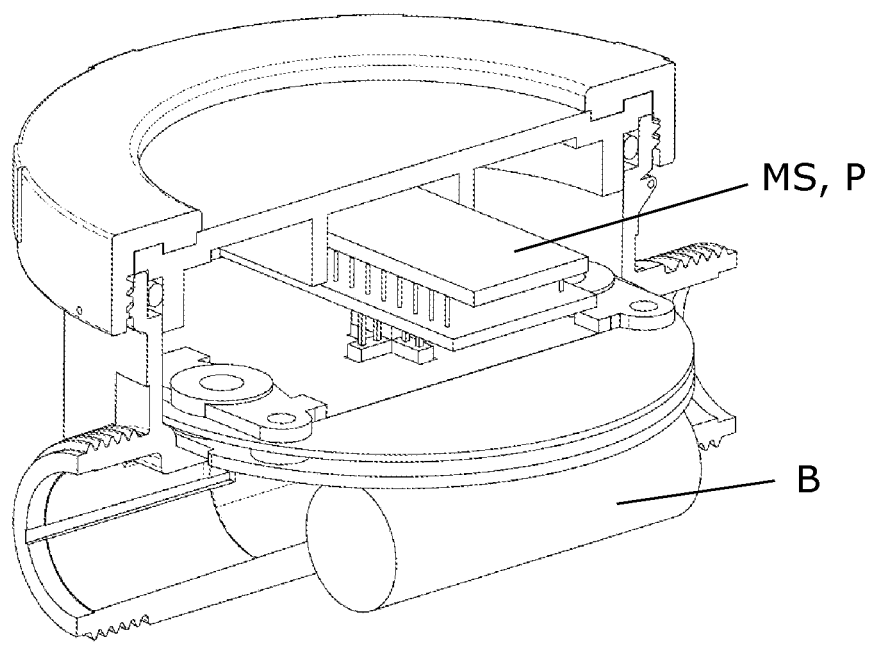
FIGS. 5 and 6 illustrate 3D sketches of a specific embodiment where all components of the pressure sensor device are housed within one single housing.
Figure 6:
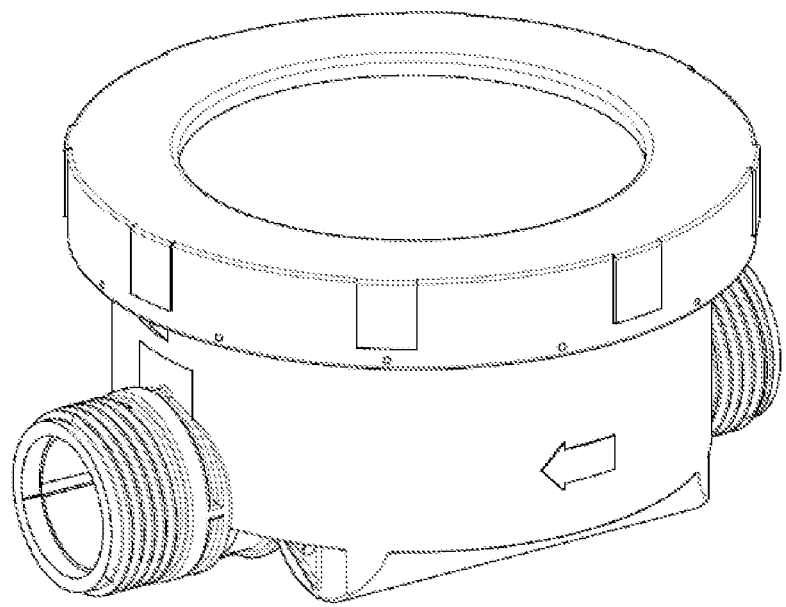

FIGS. 5 and 6 show a 3D cut away and a 3D view of a specific implementation where all of the components, including measurement system MS, data processing unit P, and communication module (not shown) are housed within one single housing formed by a monolithical composite material which serves to form a watertight enclosure for all of the mentioned components inside. As seen, the housing has threaded end portions of the through-going opening so as to allow mounting of the through-going opening in a fluid pipe system.

A threaded cover with a sealing ring serves to provide a watertight covering of the cavity of the housing where the measurement system MS, data processing unit P, and communication module are located.

E.g. the composite material forming the housing may be based on polysulphides, such as polyphenylenesulphide (PPS), such as PPS reinforced by glass fibres and/or carbon fibres. In the specific implementation, the measurement system comprises a piezoresistive type of pressure sensor.

Preferably, also a battery B is contained within the single housing, as shown, wherein the battery B is arranged to provide all necessary electrical power to power the measurement system, the data processing unit, and the communication module. In the specific implementation, the communication module is arranged for wireless communication of the data packets representing the at least one first statistical parameters calculated for a plurality of pressure measurements together with a time stamp. Preferably, an antenna of the communication module for transmitting a radio frequency signal accordingly, is also located within or with the single housing, thus the housing may contain an electrical feedthrough for a Radio Frequency signal to be transmitted by an external antenna.

It is to be understood that it may be preferred that the measurement system and the data processing system are housed within a housing forming a separate unit from the communication module, and wherein the communication module is in wired or wireless connection with the data processing unit.

To sum up: the invention provides a pressure sensor device arranged for measuring a pressure in a fluid pipe system, e.g. a utility network. A measurement system with a pressure sensor serves to measure pressure in the fluid pipe system, and a data processing unit determines at least one first statistical parameter in response to a plurality of pressure measurements: Second, third, and fourth statistical moments of the pressures measured. Data packets with such statistical parameter is then transmitted by means of a communication module, e.g. via a data network which serves for remote reading of utility meters. Such pressure sensor device in a battery driven form can be placed at remote locations in a fluid pipe system to monitor pressure transients, e.g. in a water distribution system. Especially, a time stamp may follow the statistical parameter sent, such that it is possible to track pressure transient creating events on the fluid pipe system.

Although the present invention has been described in connection with the specified embodiments, it should not be construed as being in any way limited to the presented examples. The scope of the present invention is to be interpreted in the light of the accompanying claim set. In the context of the claims, the terms "including" or "includes" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A pressure sensor device arranged for measuring a pressure in a fluid pipe system, the device comprising:
   a measurement system comprising a pressure sensor arranged for performing measurements of pressure at a position in the fluid pipe system;
   a data processing unit arranged for processing data related to the measurements of pressure so as to determine at least one first statistical parameter selected from:
   a second statistical moment,
   a third statistical moment, or
   a fourth statistical moment;
   wherein the at least one first statistical parameter is calculated in response to a plurality of measurements of pressure as a measure of pressure transients in the fluid pipe system; and
   a communication module arranged for transmitting data packets representing the at least one first statistical parameter to an associated receiver,
   wherein the measurement system is arranged for performing the plurality of measurements of pressure according to a predefined measurement time sequence so that pressure is measured at a plurality of measurement times within a measurement time window, which is randomly spaced in time.

2. The device according to claim 1, wherein the communication module is arranged to receive data from an associated remote transmitter.

3. The device according to claim 2, wherein the measurement system is arranged to perform a pressure measurement in response to a request from the associated remote transmitter.

4. The device according to claim 1, wherein the at least one first statistical parameter is the third statistical moment.

5. The device according to claim 1, wherein the data processing unit is arranged to calculate at least one second statistical parameter in response to the plurality of measurements of pressure, the at least one second statistical parameter being selected from:
   the average pressure measured with the plurality of measurements of pressure;
   the maximum pressure measured with the plurality of measurements of pressure;
   the minimum pressure measured with the plurality of measurements of pressure; or
   the coefficients of a Fourier transform of the plurality of measurements of pressure, said plurality of measurements constituting a time series of pressure values.

6. The device according to claim 1, wherein the communication module is arranged to transmit the data packets according to a predefined transmission time sequence.

7. The device according to claim 1, wherein the device is arranged to include in the data packets a time stamp for indicating a time for performing the plurality of measurements of pressure associated with the respective at least one first statistical parameter.

8. The device according to claim 1, being arranged for measuring at least one of flow rate, temperature, noise, or turbidity.

9. The device according to claim 1, being integrated with a consumption meter arranged for measuring a flow rate of the fluid, and for transmitting data packets comprising consumption data to an associated receiver.

10. The device according to claim 1, wherein the communication module is arranged to transmit the data packets representing the at least one first statistical parameter via a communication network arranged for remote reading of utility meters.

11. The device according to claim 1, wherein the communication module is arranged to transmit the data packets representing the at least one first statistical parameter in response to a measured pressure or a parameter derived therefrom exceeding a predefined threshold.

12. The device according to claim 1, wherein at least part of the measurement system, the data processing unit, and at least part of the communication module are housed within one single housing.

13. The device according to claim 1, wherein the device is battery powered.

14. A pressure sensor system arranged for measurement of pressure in a fluid pipe system, the system comprising
   a plurality of pressure sensor devices according to claim 1 arranged for measuring pressure at respective positions in the fluid pipe system, and a receiver arranged to receive data packets representing the at least one first statistical parameter from the plurality of pressure sensor devices.

15. A method for monitoring pressure in a fluid pipe system, the method comprising performing pressure measurements with a pressure sensor arranged at a position in the fluid pipe system, determining at least one first statistical parameter selected from:

a second statistical moment, a third statistical moment, or a fourth statistical moment;

wherein the at least one first statistical parameter is calculated in response to a plurality of pressure measurements as a measure of pressure transients in the fluid pipe system; and transmitting data packets representing the at least one first statistical parameter to an associated receiver;

wherein the plurality of measurements of pressure is made according to a predefined measurement time sequence so that pressure is measured at a plurality of measurement times within a measurement time window, which is randomly spaced in time.

* * * * *